United States Patent [19]

Pettigrew

[11] Patent Number: 4,769,587
[45] Date of Patent: Sep. 6, 1988

[54] POWER FACTOR CONTROL WITH OVERVOLTAGE AND UNDERVOLTAGE OVERRIDE CONTROL IN A CAPACITOR CONTROL SYSTEM FOR A DISTRIBUTION SYSTEM

[75] Inventor: Robert D. Pettigrew, Seminole, Fla.

[73] Assignee: Beckwith Electric Co., Largo, Fla.

[21] Appl. No.: 23,562

[22] Filed: Mar. 9, 1987

[51] Int. Cl.⁴ .............................................. G05F 1/70
[52] U.S. Cl. ..................................... 323/209; 323/211
[58] Field of Search ................................ 323/209–211, 323/205

[56] References Cited

U.S. PATENT DOCUMENTS 3,300,712  1/1967  Segsworth ......................... 323/209
4,055,795  10/1977  Mathieu .............................. 323/211

FOREIGN PATENT DOCUMENTS 57122    5/1981  Japan .................................. 323/211
94125    5/1986  Japan .
771643  10/1980  U.S.S.R. ............................. 323/205
107030   2/1984  U.S.S.R. ............................. 323/209
1257631  9/1986  U.S.S.R. .

Primary Examiner—William H. Beha, Jr.
Attorney, Agent, or Firm—Wallenstein, Wagner, Hattis & Strampel, Ltd.

[57] ABSTRACT

A method and capacitor control apparatus for controlling the power factor and voltage on an electrical distribution line based on the power factor on the line subject to a voltage override control. Hysteresis above an undervoltage limit and below an overvoltage limit prevent undesired oscillation in switching the capacitor controls to and from the distribution line.

14 Claims, 2 Drawing Sheets

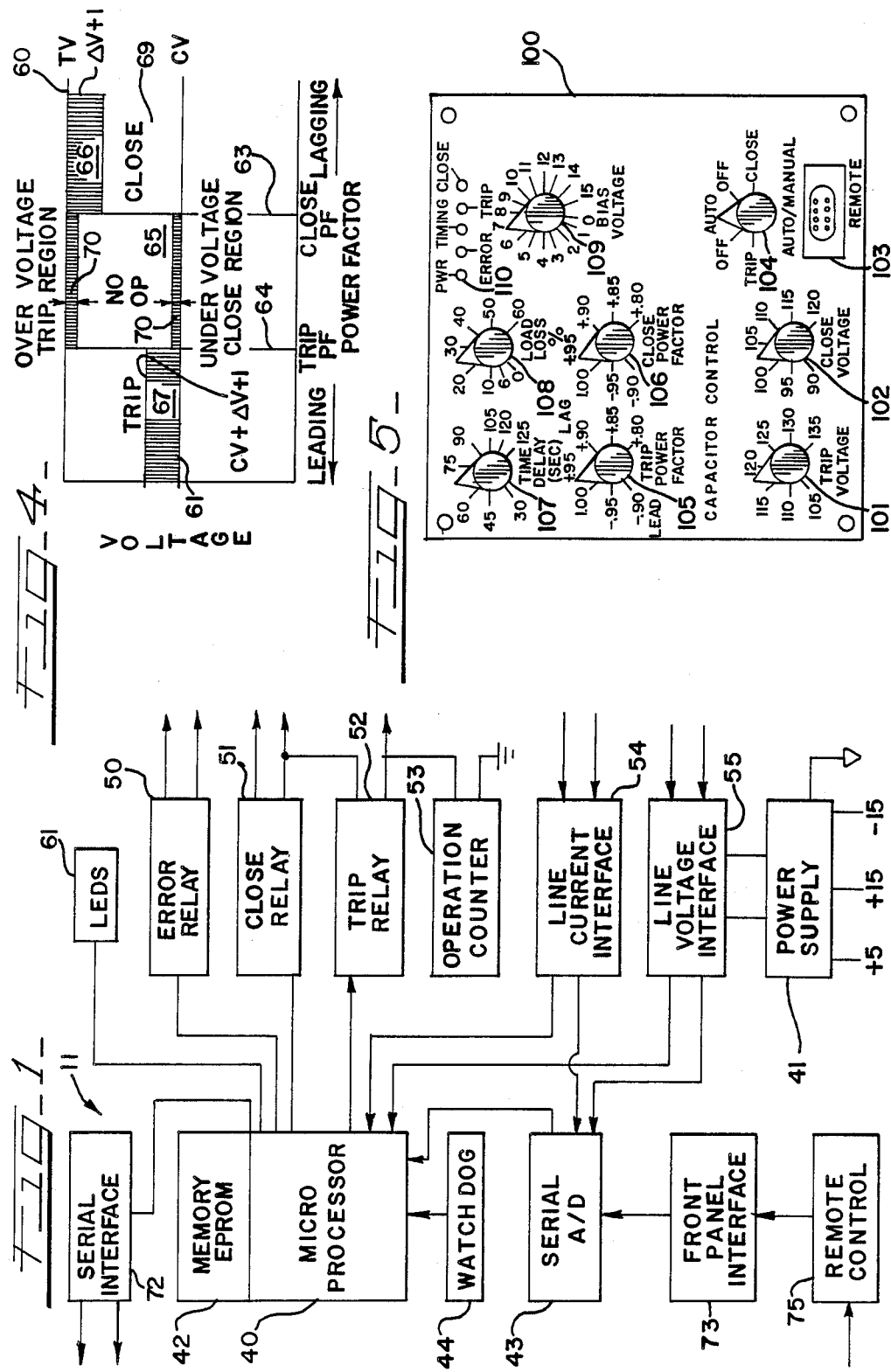

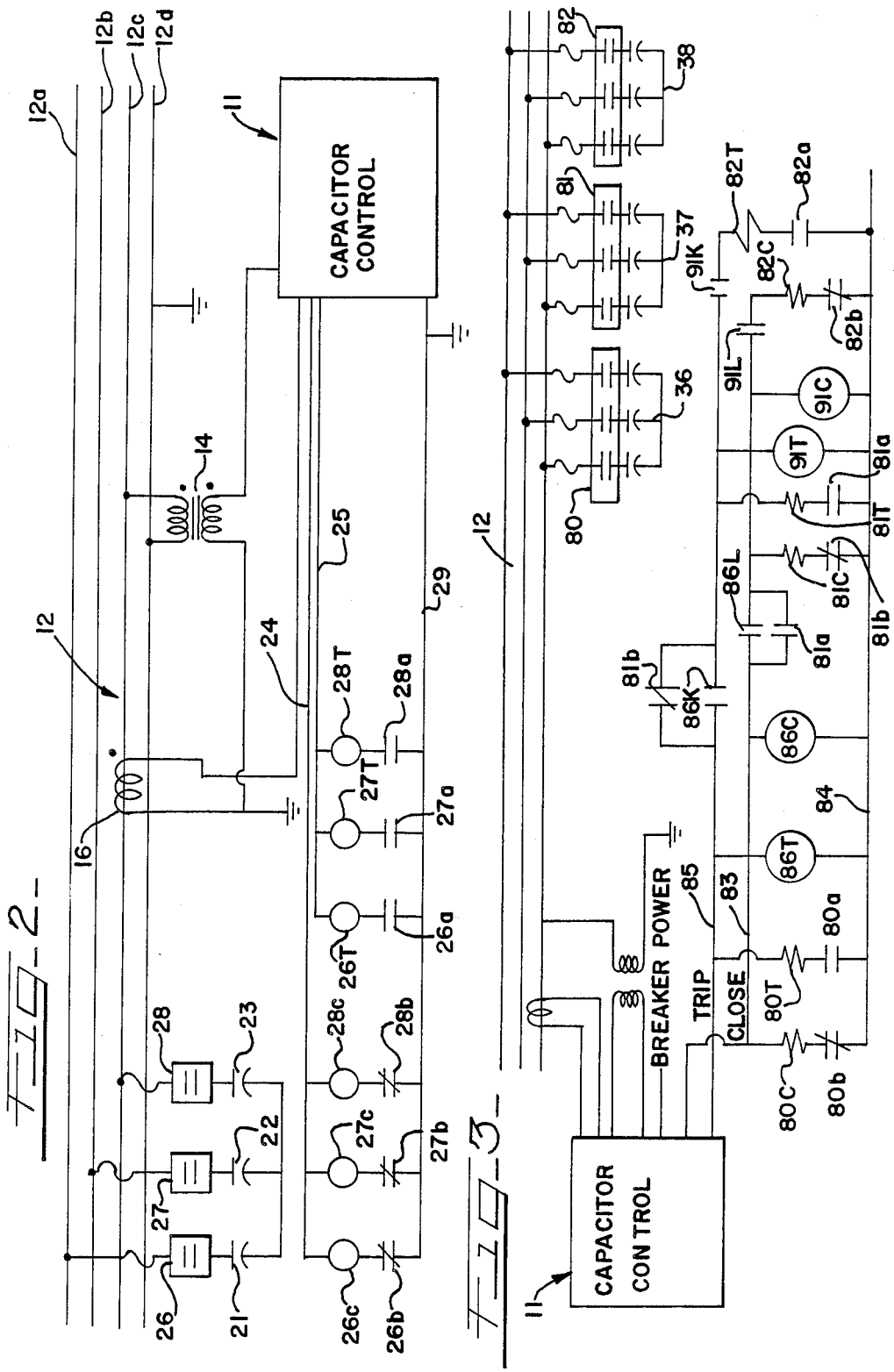

POWER FACTOR CONTROL WITH OVERVOLTAGE AND UNDERVOLTAGE OVERRIDE CONTROL IN A CAPACITOR CONTROL SYSTEM FOR A DISTRIBUTION SYSTEM

BACKGROUND OF THE INVENTION

This invention relates generally to control systems for controlling the power factor of AC (alternating current) electric power supply or distribution systems and, specifically, to such control systems wherein capacitors are switched in and out of the power supply system as needed to effect power factor compensation.

AC electric power supply or distribution systems tend to undergo undesirable reactive power changes when subjected to large reactive draws caused by connection and disconnection of dynamic reactive loads. Reactive power flow also increases the losses of the power system, resulting in a higher cost of power delivered to the user. It is necessary, therefore, to provide means for correcting the power factor on the line so that other electrical equipment on the power line is not disturbed and losses are minimized. Capacitor based systems for controlling the power factor of a supply or distribution system are known in the art. Such prior art capacitor based systems utilize voltage level, current level, load demand, and vars as the sensed parameters.

Voltage responsive controls may or may not provide adequate power factor control. Capacitor banks located close to the substations do not have a large effect on the voltage when switched on and off. However, these banks do effect the power factor sensed at the substation. In contrast, banks located a long distance from the substation will have a significant effect on the local voltage when switched on and off, therefore, voltage control systems work well at these remote locations.

Current responsive controls are applied under the assumption that when load is heavy, the voltage will be low and power factor will be poor. Seasonal variations in load mix may make this assumption invalid. Summer AC load may be ideally suited to this type of control, however, in the winter, the same location may have a heavy load that is primarily resistance heating with unity power factor.

Vars sensing controls respond to the var level on the circuit. However, during periods of heavy resistive loading, the capacitors will not be switched on unless the vars control includes a low voltage override unit. This may result in poor voltage profile along the line. During periods of moderate load level, the power factor may be excessively lagging but the var level may not be high enough to switch the bank on. Also during periods of heavy load, the power factor may be acceptable, however, the var level could exceed the var control setting. This will cause the capacitor bank to be on, regardless of the voltage level. If the voltage is high during this period, the var control could cause an overvoltage condition.

SUMMARY OF THE INVENTION

The present invention provides a method and control apparatus for controlling the power factor of an electrical power distribution system for selectively switching capacitor banks in direct response to power factor parameters but subject to voltage parameter override.

The method and control apparatus also modifies the operating characteristics during periods of light loads.

The foregoing features and advantages of the present invention will be apparent from the following more particular description of the invention. The accompanying drawings, listed hereinbelow, are useful in explaining the invention wherein.

BRIEF DESCRIPTION OF THE DRAWINGS

FIG. 1 is a block diagram of the inventive capacitor control apparatus;

FIG. 2 is a circuit diagram showing the capacitor control apparatus of FIG. 1 connected to a power line to control a bank of capacitors;

FIG. 3 is a circuit diagram showing the inventive capacitor control apparatus of FIG. 1 connected to a power line to control multiple banks of capacitors;

FIG. 4 is a graph showing the inventive method of operation of the capacitor control apparatus of FIG. 1; and FIG. 5 is a front view of the face panel of the capacitor control apparatus of FIG. 1.

DETAILED DESCRIPTION OF THE INVENTION

FIG. 1 shows a block diagram of the inventive capacitor control apparatus 11. However, prior to explaining the details of the apparatus or system 11, refer to FIG. 2 which depicts the apparatus as it is used or applied in a electrical power distribution system.

FIG. 2 shows the inventive capacitor control apparatus 11 connected to a three phase AC powerline generally labeled as 12 including a neutral and grounded line 12d. Generally, capacitor banks are placed on distribution circuits for two reasons. A primary reason is to maintain the voltage profile along the circuit ensuring that the customers' utilization voltage is within acceptable limits. Recent changes in utility rate structures and contractual agreements with large wholesale power users require or provide for penalties if the power factor of these leads is not within preset limits. Secondly, each radial circuit has a combination of fixed and switched capacitors that provide capacitive vars to compensate for inductive load vars. The circuit's power factor, measured at the substation bus connection, should be controlled within acceptable limits by the switched capacitor banks. In addition, the voltage level at points along a distribution line must be controlled so that this level remains within the legal limits required by regulatory agencies.

In FIG. 2, potential transformer 14 couples a representative voltage from the powerlines to the capacitor control 11 as a first input. A current transformer 16 couples a current representative of the current on the lines to the capacitor control 11 as a second input, all as is known. Power switches 26, 27 and 28 electrically and selectively couple high voltage capacitors 21, 22 and 23 respectively to lines 12a, 12b and 12c. The capacitor control 11 connects to suitable closing actuator means 26c, 27c and 28c through lead 24 and ground lead 29, and connects to tripping actuators 26T, 27T and 28T through lead 25 and the ground lead. Power switches 26, 27 and 28 have respective normally open contacts 26a, 27a and 28a; normally closed contacts 26b, 27b and 28b arranged to selectively allow opening and closing the power switches 26, 27 and 28 connecting the high voltage capacitors 21, 22 and 23 to the power lines 12.

The operation of the application or use of the system of FIG. 2 will be explained hereinbelow.

The capacitor control apparatus 11 includes a microprocessor commercially designated as a MC6803CL. Microprocessor controlled power distribution systems per se are known in the art as exemplified by U.S. Pat. No. 4,419,619; and further, the programming of microprocessors to perform required selected functions is also old, and per se neither of these concepts are inventive concepts of the present invention.

Refer now to FIG. 1. The microprocessor 40 operates to selectively connect (close) and disconnect (trip) capacitor banks connected to the power line based directly on a power factor parameter and with a voltage override, as will be explained. Microprocessor 40 includes standard operating accessory components including a power supply 41, memory EPROM 42, an analog to digital converter 43, and a watchdog timer 44. While the individual circuits depicted by the blocks in FIG. 1 are per se known in the art, the method of operation of the apparatus and system of FIG. 1, and the overall system concept are, however, believed novel.

The capacitor control apparatus or system 11 includes various interfacing and isolating interfaces as will now be explained. The error relay 50 closes on loss of power; or, if an error occurs as determined by the self diagnostics of the microprocessor. With power on correctly and no errors, the microprocessor energizes the relay and opens the contact. Self diagnostic microprocessor routines are, of course, well known in the art. The close relay 51 is a normally open relay which operates to connect the capacitor banks to the power line. The trip relay 52 is a normally open relay which operates to remove or disconnect the capacitor banks from the power lines. The operation counter 53 is a mechanical counter which increments one count for each close of the capacitor-bank.

The line current interface 54 is transformer coupled to the line and provides two outputs. One output is a DC voltage representation of the amplitude of the current. The other output is a square wave used for zero crossing information to enable the microprocessor 40 to measure the time difference between the voltage and current square waves to provide power factor information. The DC voltage output is coupled to the A/D converter 43 and to the microprocessor 40.

The line voltage interface 55 provides a square wave output in response to the incoming voltage signal and provides the same outputs as the current interface 54.

The serial analog to digital convertor (A/D) 43 provides a serial interface to the microprocessor. The inputs are voltage amplitude, current amplitude, front panel potentiometer settings and the control switch. A memory EPROM 42 contains the program used by the microprocessor, and may be part of the microprocessor. The serial interface 72 provides standard RS232 output/input levels to communicate with the remote control. The front panel interface 73 provides inputs to the microprocessor 40 from the front panel (digital switch or potentiometers) setting data. It also provides an interface for a Supervisory Control and Data Adquisition (SCADA) system to input to the capacitor control apparatus 11 by contact closures, this will allow the main control switch to be controlled by the SCADA system.

The power supply 41 receives a voltage from a separate transformer and provides the regulated voltages required by the circuitry of FIG. 1. The LEDs 61 provide an indication of the status of the system such as a power on indicator, an error indication, a timing indicator and trip and close indicators.

The microprocessor 40 controls the functioning of the capacitor control apparatus and system 11. In the typical operation, the microprocessor 40 reads the outputs of the A/D converter 43 to determine the set points and checks for overlapping set points. Next the microprocessor reads the voltage and current amplitude and checks the voltage for over and under set points. The time difference between the voltage and current zero crossing is measured and then converted to a power factor reading. The lead or lag is determined by reading the voltage and current to see which parameter is high. Based on the power factor and voltage parameters, the microprocessor closes or trips the capacitor bank.

As mentioned above, the concept or principle of this capacitor control 11 is to measure the power factor and operate the capacitor bank based on this parameter; and, importantly, there is also a voltage override to provide voltage regulation protection.

The method of operating the apparatus of FIG. 1 and hence the operating matrix for the capacitor control is as shown in FIG. 4. FIG. 4 is a cartesian plot with the axis of abscissas indicating the power factor on the line and with the axis of ordinates indicating the voltage level on the line. The trip voltage (TV) indication is a preselected upper voltage level delineating an acceptable maximum voltage and an overvoltage region wherein it is desired to trip a capacitor bank in order to reduce the voltage on the line, an effect which is known.

The close voltage (CV) indication is a preselected lower voltage level delineating an acceptable minimum voltage and an under voltage region wherein it is desired to trip the capacitor bank in order to increase the voltage on the line, an effect which is also known.

The trip power factor (P.F.) indication is a preselected limit of power factor that is acceptable, and the close P.F. indication is a preselected limit of power factor that is acceptable.

See the notation on the graph of FIG. 4 labeled TRIP. This is the region wherein a power factor more leading than the trip PF limit will cause the capacitor control apparatus 11 of FIG. 1 to trip a capacitor bank to disconnect (remove) the bank from the line and correct the power factor toward the NO OP region (65). Likewise, the CLOSE RFGION (69) is the region wherein a power factor more lagging than the close PF limit will cause the capacitor bank to be closed or connected to the line to tend to correct the power factor to the NO OP region.

Importantly note that if the line voltage is above the trip voltage (TV) level, the overvoltage parameter of the line overrides the power factor parameter. Likewise if the line voltage is below the close voltage (CV) level, the undervoltage parameter of the line overrides the power factor parameter. It is only when the line voltage is between the upper acceptable voltage (TV) and the lower acceptable voltage (CV) that the power factor parameter selectively controls the connection (close) and disconnection (trip) activation of the capacitor banks.

Assume as an example that the voltage on the power lines of FIG. 2 is within the preset upper (TV) and lower (CV) voltage limits, and the power factor (P.F.) is within the preset trip P.F. and close P.F. limits; that is, the power lines are operating optimally as concerns voltage and power factor. In this condition, the capacitor control 11 would be idling; that is, it is in the no operation (NO OP) region of FIG. 4.

If the voltage on the lines is greater than the trip voltage (TV) level, indicated by horizontal line 60, the control apparatus 11 will cause the capacitors to trip. If the voltage is less than the close voltage level (CV), indicated by horizontal line 61, the control apparatus will cause the capacitors to close (or more correctly, cause the capacitor switches to close to connect the capacitors to the line).

If the line voltage is between the TV and CV levels when the power factor (P.F.) becomes more lagging than the close power factor setting (note vertical line 63 in FIG. 4), the control apparatus 11 will cause the capacitors to close to correct the power factor. If the power factor becomes more leading than the trip power factor setting (note vertical line 64 in FIG. 4), the control apparatus 11 will cause the capacitors to trip to correct the power factor.

As mentioned above, when the line voltage and power factor return to or are within the voltage and power factor settings (note the region indicated as 65 bordered by horizontal lines 60, 61 and vertical lines 63 and 64), the capacitor control 11 will not operate.

A condition may exist where the operation of the capacitor bank can cause inputs to move from the overvoltage trip region to the trip hysteresis region 66 and back to the overvoltage region. That is, assume an overvoltage condition is sensed and a capacitor bank is tripped. This causes the voltage to drop. However, if the control apparatus 11 senses a power factor more lagging than the close PF, the control apparatus would tend to issue a command to close the capacitor bank; if the capacitors are closed the voltage would move up. The foregoing would, in effect, cause an unwanted oscillatory condition. To avoid such condition, the capacitor control 11 measures the change in voltage level $\Delta V$ when the bank trips. The capacitor control then creates a hysteresis region 66 such that the input voltage must drop below a level equal to the trip voltage setting less the voltage change minus one volt (TV-$\Delta V$-1) before entering the close power factor region 69. The similar process is also used in the close hysteresis region 67, since a low voltage and leading power factor condition would close the bank, potentially causing an oscillation. However, the $\Delta V$ measurement prevents this possibility since the hysteresis region is always 1 volt wider than the measured $\Delta V$.

In the event that the input voltage and power factor conditions are initially in the no operation region 65 and move to the hysteresis region 66, the apparatus will close due to lagging power factor. If this causes an over voltage condition, the control apparatus 11 will cause the capacitor to trip. At this point, the $\Delta V$ hysteresis would prevent any further operations until the conditions moved out of the hysteresis region.

In all cases, a minimum of 1V AC hysteresis is provided around the trip voltage and close voltage setpoints, as shown at 70 in FIG. 4. The hysteresis region $\Delta V$ is also a minimum of one (1) volt.

In the inventive method as long as the voltage remains within the overvoltage (TV) and undervoltage (CV) settings, the apparatus will operate the capacitors based on the power factor settings. If the voltage should exceed either setting the apparatus will ignore the power factor and operate the capacitors to bring the voltage of the line within the preselected settings; thus, as stated above, the inventive system provides a power factor control with voltage override.

Refer now to FIG. 5, which shows the front panel 100 of the capacitor control apparatus 11. Panel 100 provides control knobs for setting the control points for the inventive capacitor control 11.

The trip voltage knob 101 sets the trip voltage TV of FIG. 4. The close voltage knob 102 sets the close voltage of FIG. 4. The Remote Access Connector 103 enables coupling to standard RS-232 level interface to enable both transmittal and receiving of data, and also allows a discrete SCADA system to control the capacitor control apparatus 11. The AUTO/MANUAL knob 104 enables manual or automatic operation, or disables operation. When the capacitors trip or open when the apparatus is in Auto or when using the AUTO/MANUAL switch 104, there is a five minute delay before they can be reconnected to permit the capacitors to discharge. While in the OFF position, the control apparatus 11 continues to take measurements, but the capacitor control will not respond.

As a safety feature, a 30 second delay is incorporated into the response to change the AUTO/MANUAL switch from OFF to AUTO, OFF to TRIP, or OFF to CLOSE. It is known that the capacitors have a history of failing when being switched. Since many installations have these capacitors mounted directly overhead of the control unit, these failures can represent a danger to personnel using the AUTO/MANUAL switch. The 30 second delay allows personnel time to move away from the control unit prior to the capacitors being switched. The 30 second safety delay is bypassed when the SCADA interface in the remote connector 103 is used to control the capacitors.

The trip power factor knob 105 controls the Trip P.F. of FIG. 4. The close power factor knob 106 controls the close P.F. setting of FIG. 4.

The time delay knob 107 sets an adjustable time delay for all Close and Trip functions of 30 to 125 seconds. If the voltage exceeds the trip voltage setting by 12 percent or drops below the close voltage setting by 12 percent, the time delay is reduced to 10 percent of the setting. This provides a fast response to sudden, large changes in system voltage.

The load loss knob 108 enables a load loss undercurrent setting that can be set from 0 to 60 percent of full-load current. When the measured current drops below the setting of the knob 108, and depending upon the setting of internally programmable switches, not shown, the control apparatus will do one of the following. It will disable the load loss function, i.e. the low current will have no effect; or it will inhibit the close functions only; or it will not allow the trip power factor setting to be leading, which is useful during light load period to prevent high voltages during such periods; or it will revert to a voltage only control function, ignoring the trip power factor and the close power factor settings.

The Bias Voltage Control knob 109 works in conjunction with an external contact to actuate a reduction in the Line Voltage reading by the voltage level set on the Bias Voltage control knob. This biased line voltage is the actual voltage used to determine what operation the unit will perform. When the contact is open, the biased line voltage and the line voltage are the same; when closed, the biased line voltage is equal to the line voltage minus the bias voltage. This effectively raises the trip voltage and close voltage settings by the bias voltage setting.

The LEDs 110 provide respective indications of power on, error, timing, trip, and close operations or occurences.

FIG. 3 is somewhat similar to FIG. 2 and shows the inventive capacitor control 11 connected in a typical application for switching multiple capacitor banks. In the application of FIG. 3, the capacitor banks 36, 37 and 38 are separately controlled by power switches 80, 81 and 82. These switches may be three-phase devices, as shown, or each switch may be three single-phase devices controlled in parallel. It is desirable to close and trip the banks at different times and in stepped sequence. For this purpose, each capacitor bank is controlled by respective close and trip relays. The time delay units 86T, 86C, 91T and 91C associated with respective trip and close relays provide a time delayed output to energize the respective relays which cause the capacitor banks 36, 37 and 38 to be activated in stepped, time delayed sequence.

In the embodiment shown in FIG. 3, the close and trip actuators 80C and 80T, control the power switch 80 and capacitor bank 36; close and trip actuators 81C and 81T, control power switch 81 and bank 37; and, close and trip actuators 82C and 82T, control power switch 82 and bank 38. The power switches typically have auxiliary contacts that operate when the switch opens and closes. The "a" contacts close when the power switch is closed and open when the switch is opened. The "b" contacts operate in the opposite manner. Typically, an "a" contact is in series with each trip actuator and a "b" contact is in series with each close actuator, as shown in FIG. 3.

The close actuators 80C, 81C and 82C are connected across leads 83 and 84. The trip actuators 80T, 81T and 82T are connected across leads 85 and 84. The time delay unit 86C is connected in parallel with close actuator 80C and the time delay unit 86T is connected in parallel with trip actuator 80T. The contact 86K of delay unit 86T is connected in series in line 85, and the contact 81b of power switch 81 is connected in parallel with contact 86K. Similarly, contact 86L of delay unit 86C is connected in series in lead 83 and in parallel to contact 81a of power switch 81. Delay unit 91T and delay unit 91C are connected across leads 85 and 84 and leads 83 and 84 respectively. Contact 91K of delay unit 91T is connected in series in line 85 and contact 91L of delay unit 91C is connected in series in line 83. Close actuator 82C is connected between lines 83 and 84, and trip relay 82T is connected between lines 85 and 84.

In operation, assume a close command is received. Close actuator 80C is energized to close power switch 80, connecting the capacitor bank labeled 36 to the three-phase power line 12. Delay unit 86C will be energized at the same time. A predetermined time delay after delay unit 86C is energized, its contact 86L closes, and close actuator 81C and delay unit 91C can now be energized. Close actuator 81C will cause power switch 81 to close connecting the capacitor bank 37 to the power line. Also contact 81a of power switch 81 will be closed to maintain the circuit path through lead 83. A predetermined time delay after delay unit 91C is energized, its contact 91L closes to enable close actuator 82C to close power switch 82 and cause the capacitor bank 38 to be connected. Thus the banks 36, 37 and 38 are connected in stepped sequence.

The operation of the trip actuators 80T, 81T and 82T and the associated delay units 86T and 91T is essentially identical to that described above except that these units disconnect the capacitor banks from the power line.

While the invention has been particularly shown and described with reference to a preferred embodiment thereof, it will be understood by those skilled in the art that various changes in form and details may be made therein without departing from the spirit and scope of the invention.

I claim:

1. An apparatus for controlling voltage on an alternating current electrical transmission and distribution system comprising, in combination, means for sensing the load power factor in said system, means for sensing voltage, at least one capacitor means selectively switchable to said system, control means for selectively switching said capacitor means in response to the power factor in said system, said sensing means sensing the power factor of said system and the voltage of said system, voltage override means for setting overvoltage and undervoltage levels at which the system will override the power factor responsive control and for controlling the system in response to voltage, means selectively storing a factor representative of the overvoltage and undervoltage magnitude at the time the capacitor means is switched into or out of the system; and hysteresis means for preventing response to the power factor setting until the voltage changes by an amount larger than the voltage change at the time the capacitor means is switched.

2. An apparatus as in claim 1 further including means for overriding the activation of said power factor responsive means when the voltage is above said upper voltage limit, and means for overriding the activation of said power factor responsive means when the voltage is below said lower voltage limit.

3. An apparatus as in claim 1 further including means for overriding the activation of said power factor responsive means whenever the voltage is not within the upper and lower voltage limits.

4. An apparatus as in claim 1 further including means for providing a buffer area adjacent to the voltage levels and adjacent to the power factor limits to provide a hysteresis or delay of actuation as the line characteristics move through said levels and limits.

5. An apparatus as in claim 1 further including means for providing a hysteresis region contiguous to the overvoltage level, a close power factor limit and a trip power factor limit, said hysteresis providing means including means for sensing the voltage changes effected when the capacitor means are selectively opened and closed and for effectively establishing a reduced upper voltage level which will prevent any actuation of the system until the voltage and power factor conditions move out of said hysteresis region.

6. An apparatus as in claim 1 further including means for providing a close hysteresis region contiguous to the undervoltage level and the trip power factor limit, said hysteresis providing means including means for sensing the voltage changes effected when the capacitor means are selectively opened and closed and for effectively establishing an increased undervoltage level which will prevent any actuation of the system until the voltage and power factor conditions move out of said hysteresis region.

7. An apparatus as in claim 1 further including manually operable switch means and delay circuit means operative by said manually operable switch means for delaying the switching of the capacitor means for a preselected period of time thereby enabling the person operating the manually operable switch means to move away from said apparatus prior to the capacitor means being switched as a safety feature, it being known that capacitor means have a history of failing when being switched.

8. An apparatus as in claim 7 further including remote control means for electrically bypassing said delay circuit means.

9. An apparatus as in claim 7 further including means for setting a load loss level percentage of full load current, to enable one of a plurality of selected functions including at least one of the following:
   (a) the load loss has no effect;
   (b) the load loss setting will inhibit the capacitor close function;
   (c) the load loss setting will inhibit the trip power factor to be leading such as in certain light load conditions, and
   (d) the load loss setting will provide only a voltage sensitive control function.

10. An apparatus as in claim 1 further including means for providing a bias voltage setting to effectively vary the trip and close voltage levels by the bias voltage as set.

11. A system for controlling the power factor on the distribution lines of an electrical distribution network, comprising:
   means for sensing the voltage on said distribution lines of said network;
   means for sensing the current of said distribution lines;
   means for determining the power factor based on said sensed voltage and said sensed current;
   means for providing overvoltage and undervoltage levels;
   means for providing leading and lagging power factor limits
   means generating and storing a trip hysteresis region below said overvoltage level and a close hysteresis region above said undervoltage region;
   capacitor means for providing a capacitance;
   switch means for tripping to remove said capacitor means from said distribution lines and for closing to apply said capacitor means to said distribution lines; and
   control means for tripping said switch means when said voltage on said distribution lines is above said overvoltage level and for closing said switch means when said voltage on said distribution lines is below said undervoltage level, when said voltage on said distribution lines is between said overvoltage and undervoltage levels and trip and close hysteresis regions, said control means for tripping said switch means when said power factor exceeds said leading power factor limit and for closing said switch means when said power factor exceeds said lagging power factor limit, so that said hysteresis regions prevent oscillatory tripping and opening of said switching means while providing power factor control with voltage override.

12. A method for controlling voltage on an alternating current electrical transmission and distribution system comprising, in combination, sensing the load power factor of a line in said system, sensing the voltage on a line of said system, selectively connecting capacitor means to said line in response to the power factor of a line in said system, setting an operating voltage region between overvoltage and undervoltage levels of a line of the system overriding the power factor responsive to voltage outside of said operating voltage region, storing a factor representative of the overvoltage and undervoltage magnitude at the time the capacitor means is switched into or out of the system, and delaying response to power factor sensing until the voltage changes by an amount larger than the voltage change at the time the capacitor means is switched.

13. A method as in claim 12 wherein the step of delaying response to the power facor sensing when the voltage is higher than the overvoltage setting provides a trip hysteresis to associated relay circuitry.

14. A method as in claim 12 wherein the step of delaying response to the power factor sensing when the voltage is lower than the undervoltage setting provides a close hysteresis to associated relay cicuitry.

* * * * *